United States Patent
Zhao et al.

(10) Patent No.: US 10,587,870 B2
(45) Date of Patent: Mar. 10, 2020

(54) 3D DISPLAY CONTROL SYSTEM AND METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenqing Zhao, Beijing (CN); Xiaochuan Chen, Beijing (CN); Ken Wen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 150 days.

(21) Appl. No.: 15/539,861
(22) PCT Filed: Dec. 21, 2016
(86) PCT No.: PCT/CN2016/111345
§ 371 (c)(1),
(2) Date: Jun. 26, 2017
(87) PCT Pub. No.: WO2017/118290
PCT Pub. Date: Jul. 13, 2017

(65) Prior Publication Data
US 2018/0007351 A1    Jan. 4, 2018

(30) Foreign Application Priority Data
Jan. 8, 2016  (CN) .......................... 2016 1 0012126

(51) Int. Cl.
*H04N 13/398* (2018.01)
*G02B 27/22* (2018.01)
(Continued)

(52) U.S. Cl.
CPC ....... *H04N 13/398* (2018.05); *G02B 27/2214* (2013.01); *H04N 13/302* (2018.05);
(Continued)

(58) Field of Classification Search
CPC .. H04N 13/398; H04N 13/305; H04N 13/376; H04N 13/383; H04N 13/302
(Continued)

(56) References Cited

U.S. PATENT DOCUMENTS

| 6,337,721 B1 | 1/2002 | Hamagishi et al. |
| 2011/0242150 A1* | 10/2011 | Song ................... G02B 27/2214 345/697 |

(Continued)

FOREIGN PATENT DOCUMENTS

| CN | 103018915 A | 4/2013 |
| CN | 103096109 A | 5/2013 |

(Continued)

OTHER PUBLICATIONS

The First Chinese Office Action dated Nov. 1, 2017; Appln. No. 201610012126.X.
(Continued)

*Primary Examiner* — Jefferey F Harold
*Assistant Examiner* — Omer Khalid
(74) *Attorney, Agent, or Firm* — Ladas & Parry LLP

(57) ABSTRACT

A 3D display control system and method are provided. The system includes: a display module, including a plurality of pixel units; an eye position detection device, configured to detect first position moving information and second position moving information; and a lens plate, located at a light emergent side of the display module, and configured to generate a plurality of first lens equivalent units and a plurality of second lens equivalent units, wherein at least one pixel unit directly below each first lens equivalent unit forms a first pixel unit group, and each first lens equivalent unit is configured to redirect light from the first pixel unit group directly therebelow toward a first position.

18 Claims, 3 Drawing Sheets

(51) Int. Cl.
*H04N 13/305* (2018.01)
*H04N 13/376* (2018.01)
*H04N 13/383* (2018.01)
*H04N 13/302* (2018.01)

(52) U.S. Cl.
CPC ......... *H04N 13/305* (2018.05); *H04N 13/376* (2018.05); *H04N 13/383* (2018.05)

(58) Field of Classification Search
USPC .......................................................... 348/59
See application file for complete search history.

(56) References Cited

U.S. PATENT DOCUMENTS

| | | |
|---|---|---|
| 2011/0316898 A1 | 12/2011 | Nam |
| 2012/0249537 A1 | 10/2012 | Bae et al. |
| 2013/0249896 A1 | 9/2013 | Hamagisi |
| 2016/0173860 A1 | 6/2016 | Wang et al. |
| 2016/0212414 A1 | 7/2016 | Chen |
| 2016/0360187 A1* | 12/2016 | Smithwick ........... H04N 13/398 |

FOREIGN PATENT DOCUMENTS

| | | |
|---|---|---|
| CN | 103576408 A | 2/2014 |
| CN | 104007585 A | 8/2014 |
| CN | 203838417 U | 9/2014 |
| CN | 104460019 A | 3/2015 |
| CN | 104701339 A | 6/2015 |
| CN | 105093543 A | 11/2015 |
| CN | 105446050 A | 3/2016 |
| KR | 1020110139549 A | 12/2011 |

OTHER PUBLICATIONS

International Search Report and Written Opinion dated Mar. 1, 2017; PCT/CN2016/111345.

* cited by examiner

3D DISPLAY CONTROL SYSTEM AND METHOD

TECHNICAL FIELD

Embodiments of the present disclosure relate to a 3D display control system and a method thereof.

BACKGROUND

With continuous development of a display technology, 3D display has become an important development trend in the field of display. A basic principle of the 3D display is that left and right eyes of a person respectively see different images, a stereoscopic image pair is formed, and then through visual processing of brain, a stereoscopic impression is generated for the person who sees the image.

At present, the 3D display is divided into a naked-eye type and a glasses-type, wherein the naked-eye 3D display is to process the image on a display device to generate the stereoscopic image pair, such that a stereoscopic impression is generated for the person who sees the image without a need to use the 3D glasses.

SUMMARY

An embodiment of the disclosure provides a 3D display control system, including: a display module, including a plurality of pixel units; an eye position detection device, configured to detect first position moving information and second position moving information; and a lens plate, located at a light emergent side of the display module, and configured to generate a plurality of first lens equivalent units and a plurality of second lens equivalent units, wherein at least one pixel unit directly below each first lens equivalent unit forms a first pixel unit group, and each first lens equivalent unit is configured to redirect light from the first pixel unit group directly therebelow toward a first position; at least one pixel unit directly below each second lens equivalent unit forms a second pixel unit group, and each second lens equivalent unit is configured to redirect light from the second pixel unit group directly therebelow toward a second position; and a control device, connected to the eye position detection device, the lens plate and the display module, and configured to execute at least one of a first operation and a second operation according to the first position moving information and the second position moving information, wherein the first operation is to determine data alignment information of the display module and display an image corresponding to the data alignment information in the display module; the second operation is to determine position adjusting information of the plurality of first lens equivalent units and the plurality of second lens equivalent units of the lens plate relative to the pixels units of the display module, and adjust positions of the plurality of first lens equivalent units and the plurality of second lens equivalent units relative to the pixel units of the display module according to the position adjusting information.

In an example, the first position and the second position are respectively positions where left and right eyes of a viewer are.

In an example, each first lens equivalent unit and each second lens equivalent unit are both column lens equivalent units.

In an example, the first lens equivalent units and the second lens equivalent units are arranged in array.

In an example, the first pixel unit group directly below each first lens equivalent unit includes a plurality of pixel units, and the second pixel unit group directly below each second lens equivalent unit includes a plurality of pixel units, each first lens equivalent unit is configured to only redirect light from one pixel unit of the first pixel unit group directly therebelow toward the first position at a same moment; and each second lens equivalent unit is configured to only redirect light from one pixel unit of the second pixel unit group directly therebelow toward a second position at a same moment.

In an example, the plurality of first lens equivalent units form a plurality of first lens equivalent unit groups, the plurality of second lens equivalent units form at least one second lens equivalent unit group, each first lens equivalent unit group includes three adjacent ones of the first lens equivalent units, each second lens equivalent unit group includes three adjacent ones of the second lens equivalent units, and the plurality of first lens equivalent unit groups and the plurality of first lens equivalent unit groups are alternately arranged.

In an example, the plurality of first lens equivalent units are arranged into a plurality of first lens equivalent unit columns, the plurality of second lens equivalent units are arranged into a plurality of second lens equivalent unit columns, and the plurality of first lens equivalent unit columns and the plurality of second lens equivalent unit columns are alternately arranged.

In an example, the lens plate is a liquid crystal lens plate.

In an example, light from the first pixel unit group is collimated light, and the light from the second pixel unit group is collimated light.

Another embodiment of the disclosure provides a display control method for the 3D display control system described above, including: obtaining first position moving information and second position moving information; and executing at least one of a first operation and a second operation according to the first position moving information and the second position moving information.

In an example, a first pixel unit group directly below each first lens equivalent unit includes a plurality of pixel units, and a second pixel unit group directly below each second lens equivalent unit includes a plurality of pixel units, the method further includes: controlling each first lens equivalent unit to only redirect light from a pixel unit of the first pixel unit group directly therebelow toward a first position at a same moment; and/or controlling each second lens equivalent unit to only redirect light from a pixel unit of the second pixel unit group directly therebelow a second position at the same moment.

In an example, the plurality of first lens equivalent units form at least one first lens equivalent unit group, the plurality of second lens equivalent units form at least one second lens equivalent unit groups, each first lens equivalent unit group includes three adjacent ones of the first lens equivalent units, each second lens equivalent unit group includes three adjacent ones of the second lens equivalent units, and the plurality of first lens equivalent unit groups and the plurality of first lens equivalent unit groups are alternately arranged, the method further includes: controlling lights transmitted by the three first lens equivalent units of each first lens equivalent unit group at a same time to be different from one another in color, and/or controlling lights transmitted by the three second lens equivalent units of each second lens equivalent unit group at the same time to be different from one another in color.

In an example, the method further includes: controlling the pixel units, except for the one pixel unit, of the first pixel unit group directly below each first lens equivalent unit to be turned off at the same moment; and/or controlling the pixel units, except for one pixel unit, of the second pixel unit group directly below each second lens equivalent unit to be turned off at the same moment.

In an example, the lens plate is a liquid crystal lens plate.

In an example, light from the first pixel unit group is collimated light, and the light from the second pixel unit group is collimated light.

DETAILED DESCRIPTION

Figure 1:
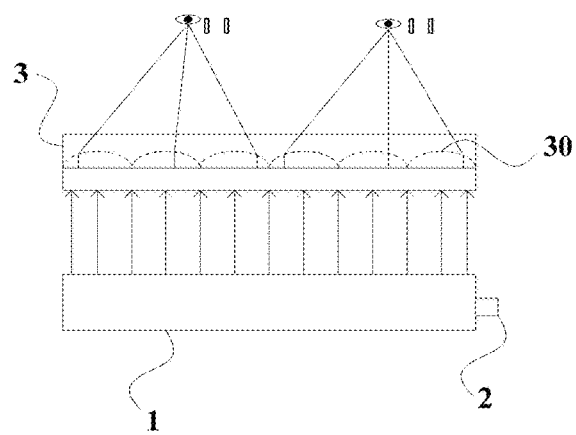
FIG. 1 is a cross-sectional schematic diagram of a 3D display control system according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

A lens plate is a manner for implementing naked-eye 3D display, and generally the lens plate is disposed on a light emergent side of the display panel. The lens plate, for example, includes a first substrate and a second substrate, and a liquid crystal layer located between the first substrate and the second substrate; a strip electrode is disposed on the first substrate, a planar electrode is disposed on the second substrate, and the liquid crystal layer in the middle is driven by an electric field between the strip electrode and the planar electrode, such that the liquid crystal layer is equivalent to a plurality of column lenses, and therefore, an image displayed by a display panel is respectively refracted toward a left eye visual area and a right eye visual area to form a stereoscopic image pair.

The inventors find that when the naked-eye 3D display device above is viewed, if both eyes of a viewer are moved, then it is possible that the left eye views a right eye image and the right eye views a left eye image, and image crosstalk is generated in viewing. Therefore, a display effect of the 3D display device above is not ideal enough. In addition, the 3D display device above is poor in energy saving.

In order to reduce the image crosstalk and improve the quality of 3D display and energy saving, an embodiment of the present disclosure provides a 3D display control system. In order to clarify the objects, technical solutions and advantages of the present disclosure, the present disclosure will be described in detail by listing the embodiments.

The embodiment of the present disclosure provides a 3D display control system, including a display module, a lens plate, an eye position detection device and a control device, wherein:

The lens plate is located on a light emergent side of the display module, and includes a plurality of lens equivalent units, and each lens equivalent unit corresponds to a plurality of pixel units in the display module; each lens equivalent unit is configured to modulate incident light from at least one pixel unit in the plurality of pixel units corresponding to the lens equivalent unit into light emitted to a left eye visual area or a right eye visual area;

The eye position detection device is configured to detect left eye position moving information and right eye position moving information of a viewer; and The control device is connected to the eye position detection device, the lens plate and the display module, and configured to determine data information of the display module according to the left eye position moving information and the right eye position moving information and display an image corresponding to the data information in the display module.

By adopting the solution, precise 3D image information can be provided for left and right eyes of the viewer; even if the eye positions are moved, the left and right eyes can still view a preferred image, such that the image crosstalk is reduced, the 3D display quality is improved and energy saving is improved.

Optionally, the lens equivalent units are column lens equivalent units.

Optionally, the plurality of lens equivalent units are arranged in array.

For example, each lens equivalent unit only redirect light incident from one pixel unit in the plurality of pixel units corresponding to the lens equivalent unit to a left eye visual area or right eye visual area. That is, each lens equivalent unit of the lens plate only modulates collimated light of one pixel, in this way, a light path is easier to control, and control precision is higher, such that a 3D display quality is improved and greater energy saving effect is realized.

Optionally, in a plurality of columns of lens equivalent units, every three columns of lens equivalent units are in one group, and for every two adjacent groups of lens equivalent units, one group of lens equivalent units modulate the collimated light into light emitted to the left eye visual area, and the other group of lens equivalent units modulate the collimated light into light emitted to the right eye visual area; or In two adjacent columns of lens equivalent units, one column of lens equivalent units modulate the collimated light into light emitted to the left eye visual area, and the other column of lens equivalent units modulate the collimated light into light emitted to the right eye visual area.

Preferably, the lens plate is a liquid crystal lens plate.

An embodiment of the present disclosure further provides a 3D display control method, which includes:

Obtaining left eye position moving information and right eye position moving information of a viewer;

Determining data information of a display module according to the left eye position moving information and the right eye position moving information; and Displaying an image corresponding to the data information in the display module.

For example, the method includes: controlling one of plurality of pixel units corresponding to each lens equivalent unit in the display module to display.

By adopting the solution, precise 3D image information can be provided for left and right eyes of the viewer; even if the eye positions are moved, the left and right eyes can still view a preferred image, such that the image crosstalk is reduced, the 3D display quality is improved and energy saving is improved.

An embodiment of the present disclosure provides a 3D display control system, including a display module, a lens plate, an eye position detection device and a control device, wherein:

The lens plate is located on a light emergent side of the display module, and includes a plurality of lens equivalent units, and each lens equivalent unit corresponds to a plurality of pixel units in the display module; each lens equivalent unit is configured to modulate incident light from at least one pixel unit in the plurality of pixel units corresponding to the lens equivalent unit into light emitted to a left eye visual area or a right eye visual area;

The eye position detection device is configured to detect left eye position moving information and right eye position moving information of a viewer; and The control device is connected to the eye position detection device, the lens plate and the display module, and configured to determine position adjusting information of the lens equivalent units of the lens plate according to the left eye position moving information and the right eye position moving information and adjust positions of the lens equivalent units of the lens plate according to the position adjusting information of the lens equivalent units.

By adopting the solution, precise 3D image information can be provided for left and right eyes of the viewer; even if the eye positions are moved, the left and right eyes can still view a preferred image, such that the image crosstalk is reduced, the 3D display quality is improved and energy saving is improved.

Correspondingly, an embodiment of the present disclosure further provides a 3D display control method, which includes:

Obtaining left eye position moving information and right eye position moving information of a viewer;

Determining position adjusting information of lens equivalent units of the lens plate according to the left eye position moving information and the right eye position moving information; and Adjusting positions of the lens equivalent units of the lens plate according to the position adjusting information of the lens equivalent units.

The advantageous effects of the present embodiment are same as those before, and are not repeated herein.

An embodiment of the present disclosure further provides a 3D display control system, including a display module, a lens plate, an eye position detection device and a control device, wherein:

The lens plate is located on a light emergent side of the display module, and includes a plurality of lens equivalent units, and each lens equivalent unit corresponds to a plurality of pixel units in the display module; each lens equivalent unit is configured to modulate incident light from at least one pixel unit in the plurality of pixel units corresponding to the lens equivalent unit into light emitted to a left eye visual area or a right eye visual area;

The eye position detection device is configured to detect left eye position moving information and right eye position moving information of a viewer; and The control device is connected to the eye position detection device, the lens plate and the display module, and configured to determine data information of the display module according to the left eye position moving information and the right eye position moving information and display an image corresponding to the data information in the display module; and determine position adjusting information of the lens equivalent units of the lens plate and adjust positions of the lens equivalent units of the lens plate according to the position adjusting information of the lens equivalent units.

By adopting the solution, precise 3D image information can be provided for left and right eyes of the viewer; even if the eye positions are moved, the left and right eyes can still view a preferred image, such that the image crosstalk is reduced, the 3D display quality is improved and energy saving is improved. Besides, the positions of the lens equivalent units of the lens plate and the data information of the display module are adjusted at the same time, such that the adjusting and controlling reaction is more sensitive.

Correspondingly, an embodiment of the present disclosure further provides a 3D display control method, which includes:

Obtaining left eye position moving information and right eye position moving information of a viewer;

Determining data information of a display module and position adjusting information of lens equivalent units of the lens plate according to the left eye position moving information and the right eye position moving information; and Displaying an image corresponding to the data information in the display module and adjusting positions of the lens equivalent units of the lens plate according to the position adjusting information of the lens equivalent units.

The advantageous effects of the embodiment are same as those before, and are not repeated herein.

As shown in FIG. 1, a 3D display control system and a display control method thereof are provided by an embodiment of the present disclosure. The system includes a display module 1, a lens plate 3, an eye position detection device 2 and a control device (not shown), wherein:

The lens plate 3 is located on a light emergent side of the display module 1, and includes a plurality of lens equivalent units 30 arranged in array (only a few columns therein are shown in the diagram), and each lens equivalent unit 30 modulates incident light into light emitted to a left eye visual area or a right eye visual area; and Referring to FIGS. 1-4, the lens plate 3 includes three first lens equivalent units 30d to 30f and three second lens equivalent units 30a to 30c. Each of the first lens equivalent units 30d to 30f is configured to redirect light from the display module 1 toward the left eye visual area (i.e., the area where a first position is); and each of the second lens equivalent units 30a to 30c is configured to redirect light from the display module 1 toward the right eye visual area (i.e., the area where a second position is).

Figure 5:
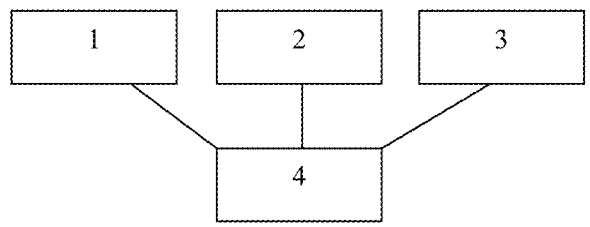
FIG. 5 is a block diagram of the 3D display control system according to the embodiment of the present disclosure.

The eye position detection device 2 is configured to detect left eye position moving information and right eye position moving information of the viewer; and The control device 4 is connected to the eye position detection device 2, the lens plate 3 and the display module 1 (see FIG. 5), and configured to determine data information of pixels of the display module 1 corresponding to respective columns of lens equivalent units 30 according to the left position moving information and the right eye position moving information; and adjusting turning on/off of the pixels of the display module 1 according to the data information of the pixels of the display module 1 corresponding to the respective columns of lens equivalent units 30.

The control device 4, for example, can be implemented by using software to facilitate execution by various types of processors. For example, an identified executable code module can include one or more physical or logic blocks of a computer instruction, for example, it can be constructed into an object, a process or a function. Even so, executable codes of the identified module are not required to be located together physically, but the identified module can include different instructions stored on different physical mediums and when these instructions are logically combined together, they form a module and can realize prescribed objectives of the module. The control device 4, for example, can also be realized by a corresponding hardware circuit, the hardware circuit comprises a Very Large Scale Integration (VLSI) circuit or a gate array as well as existing semiconductors such as logic chips and transistors, or other independent elements. The control device 4, for example, can also be implemented by using a programmable hardware device, for example a field-programmable gate array, a programmable array logic, a programmable logic device, etc.

In FIG. 1, a disposing position of the eye position detection device 2 is merely schematic and is not limited thereto.

The display module can emit collimated light. But it is noted that the collimated light mentioned in the embodiments of the present disclosure is not limited to be absolutely perpendicular to a screen, and a certain error range is allowed, for example, an included angle between the collimated light emitted from the display module 1 and the screen is 90°±α, and α is a preset error angle.

The display module 1 is not limited in type, and for example, can be a liquid crystal display module, and can also be an organic light-emitting diode display module.

A structure of the liquid crystal display module can include: a backlight module, a liquid crystal panel and a light collimation corrector, wherein the liquid crystal panel is located on the light emergent side of the backlight module, and the light collimation corrector is located between the backlight module and the liquid crystal panel. The backlight module emits a spherical optical field, and the light collimation corrector modulates the light emitted by the backlight module into collimated light, such that light is incident in a manner of being perpendicular to the liquid crystal panel.

Or, the structure of the liquid crystal display module can include a backlight module, a liquid crystal panel and a light collimation corrector, wherein the liquid crystal panel is located on the light emergent side of the backlight module; and the light collimation corrector is located at the light emergent side of the liquid crystal panel. Divergent light emitted by the backlight module is still divergent light after passing by the liquid crystal panel, and the light collimation corrector modulates the light emitted by the liquid crystal panel into collimated light, such that the light is emitted out of the liquid crystal panel in a perpendicular manner.

A structure of the organic light-emitting diode display module can include: an organic light-emitting diode display panel and a light collimation corrector, wherein the light collimation corrector is located on the light emergent side of the organic light-emitting diode display panel.

The light collimation corrector is not limited in type and for example, can be a prism film, and can also be a lens structure configured for collimation correction of light, etc.

The display module 1 includes a plurality of pixel units P. A plurality of pixel units P directly below the each of the first lens equivalent units 30d-30f form a first pixel unit group P1, and a plurality of pixel units P directly below each of the second lens equivalent units 30a-30c form a second pixel unit group P2. Here, "the first pixel unit group P1 is directly below the first lens equivalent unit 30f" means that the first pixel unit group P1 is located under the first lens equivalent unit 30f and the first pixel unit group P1 and the first lens equivalent unit 30f are overlapped in a direction perpendicular to the display module 1. Other "directly below" in the text has similar meaning.

In the present embodiment, for example, the positions of the plurality of lens equivalent units 30 on the lens plate 3 are fixed.

The structure of the lens plate 3 can include: a first substrate, a second substrate and a liquid crystal layer located between the first substrate and the second substrate, wherein a planar electrode is disposed on the first substrate; a plurality of electrode units arranged in array are disposed on the second substrate, each electrode unit includes at least two annular electrodes arranged radially, that is to say, the at least two annular electrodes are disposed concentrically; and the lens equivalent unit is formed by an electric field driving liquid crystal layer between the electrode units and the planar electrode. In the present embodiment, the positions of the lens equivalent units are unadjustable.

Or, the structure of the lens plate 3 can include: a first substrate, a second substrate and a liquid crystal layer located between the first substrate and the second substrate, wherein a planar electrode is disposed on the first substrate; a plurality of lattice electrodes arranged in array are disposed on the second substrate; and the lens equivalent unit is formed by an electric field driving the liquid crystal layer between the lattice electrodes in a corresponding position area and the planar electrode.

Figure 2:
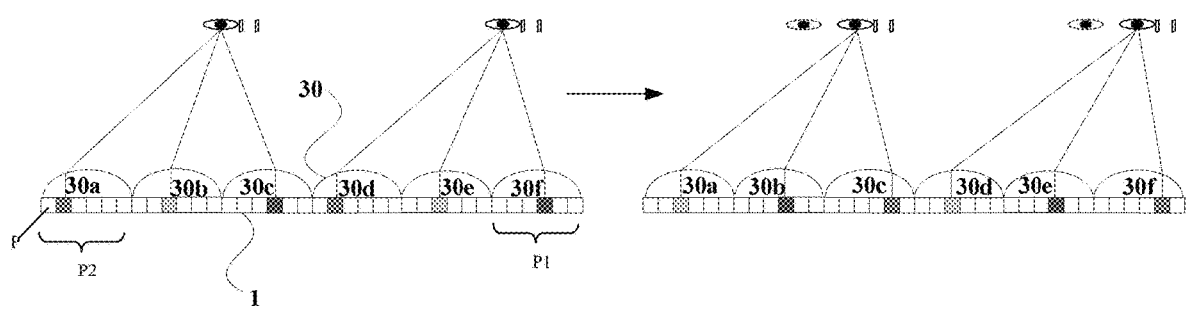
FIG. 2 is a schematic diagram of change of pixels of a display module in one embodiment of the present disclosure.
Figure 3:
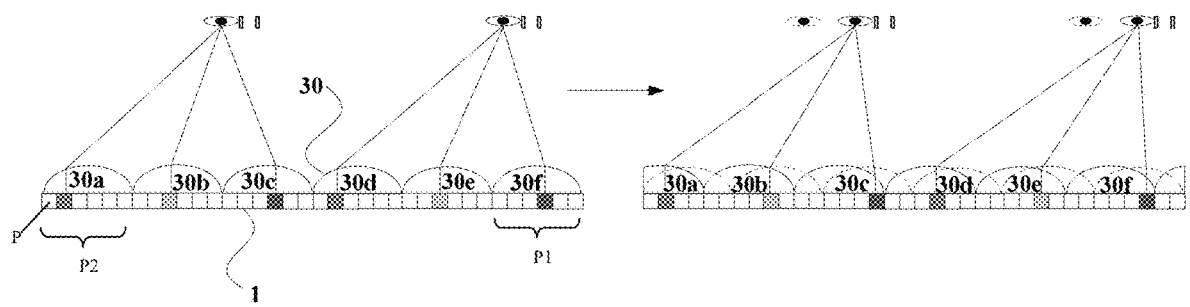
FIG. 3 is a schematic diagram of a change of lens equivalent units in another embodiment of the present disclosure.
Figure 4:
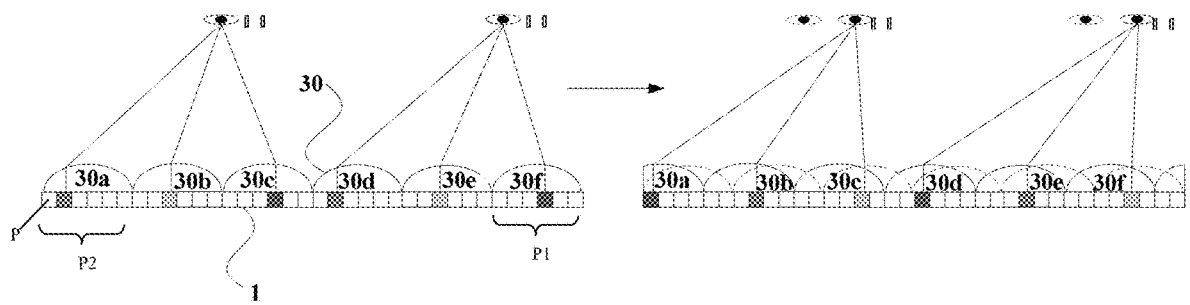
FIG. 4 is a schematic diagram of a change of lens equivalent units and pixels of a display module in yet another embodiment of the present disclosure.

As shown in FIG. 1, in the plurality of or plurality of columns of lens equivalent units 30, every three lens or every three columns of lens equivalent units are in one group; as for every two adjacent groups of lens equivalent units, one group of lens equivalent units modulate collimated light into light emitted to a left eye visual area, and the other group of lens equivalent units modulate collimated light into light emitted to a right eye visual area. Referring to FIGS. 2-4, the first lens equivalent units 30d-30f form a first lens equivalent unit group; and the first lens equivalent units 30a-30c form a second lens equivalent unit group.

In addition, it can also be that in two adjacent columns of lens equivalent units, one column of lens equivalent units modulate collimated light into light emitted to a left eye visual area, and the other column of lens equivalent units modulate collimated light into light emitted to a right eye visual area.

For example, each lens equivalent unit emits the incident light from only one of the corresponding plurality of pixel units to toward the left eye visual area or the right eye visual area. That is, each lens equivalent unit 30 of the lens plate 3 (that is, each of the lens equivalent units 30d-30f) modulates the collimated light of only one pixel, in this way, a light path is easier to control and control precision is higher, the light path of the light passing through the lens equivalent unit 30 is easier, an emergent direction of the light can be controlled precisely, and the light is enabled to fall within the left eye visual area or the right eye visual area accurately, such that a 3D display effect is enhanced, besides, the display module is more energy-saving by closing pixels that are not required.

For example, as shown in the left portion of FIG. 2, at a first moment, only the blue pixel in the plurality of pixels opposite to the lens equivalent unit 30a in the display module 1 is turned on, only the red pixel in the plurality of pixels opposite to the lens equivalent unit 30b in the display module 1 is turned on, only the green pixel in the plurality of pixels opposite to the lens equivalent unit 30c in the display module 1 is turned on, and blue light, red light and green light correspondingly emitted from the lens equivalent units 30*a*, 30*b* and 30*c* enter a viewer's right eye and are mixed; similarly, the blue light, the red light and the green light correspondingly emitted from the lens equivalent units 30*d*, 30*e* and 30*f* enter a viewer's left eye and are mixed; the viewer sees different images through the left eye and the right eye respectively, a stereoscopic image pair is formed, and then through visual processing of the brain, a stereoscopic impression is generated for the image saw by the viewer.

When the eyes are moved, the eye position detection device can detect the left eye position moving information and the right eye position moving information of the viewer, the control device operates a certain algorithm according to the left eye position moving information and the right eye position moving information to determine data information of the pixels of the display module corresponding to respective columns of lens equivalent units; and according to the data information of the pixels of the display module corresponding to the respective columns of lens equivalent units, turning on/off of the pixels of the display module is adjusted. That is, at a second moment, as shown in the right portion of FIG. 2, only the red pixel in the plurality of pixels opposite to the lens equivalent unit 30*a* in the display module 1 is turned on, only green pixel in the plurality of pixels opposite to the lens equivalent unit 30*b* in the display module 1 is turned on, only blue pixel in the plurality of pixels opposite to the lens equivalent unit 30*c* in the display module 1 is turned on, and red light, green light and blue light correspondingly emitted from the lens equivalent units 30*a*, 30*b* and 30*c* enter a viewer's right eye and are mixed; similarly, the red light, the green light and the blue light correspondingly emitted from the lens equivalent units 30*d*, 30*e* and 30*f* enter a viewer's left eye and are mixed.

In the technical solution of the embodiments of the present disclosure, a plurality of pixels opposite to the lens equivalent units in the display module are selected and controlled to be turned on/off, the control device determines the data information of the pixels of the display module corresponding to respective columns of lens equivalent units according to the left eye position moving information and the right eye position moving information, and turning on/off of the pixels of the display module is adjusted according to the data information. By adopting the solution, precise 3D image information can be provided for left and right eyes of the viewer; even if the eye positions are moved, the left and right eyes can still view a preferred image, such that the image crosstalk is reduced, the 3D display quality is improved and energy saving is improved.

Based on the same inventive concept, another embodiment of the present disclosure provides a 3D display control system, comprising a display module, a lens plate, an eye position detection device and a control device, wherein The lens plate is located on a light emergent side of the display module, and includes a plurality of lens equivalent units arranged in array, the lens equivalent units are lens equivalent units adjustable in position, and each column of lens equivalent units modulate collimated light into light emitted to a left eye visual area or a right eye visual area;

The eye position detection device is configured to detect left eye position moving information and right eye position moving information of the viewer; and The control device is connected to the eye position detection device, the lens plate and the display module, and configured to determine position adjusting information of respective columns of lens equivalent units according to the left eye position moving information and the right eye position moving information; and adjust positions of respective columns of lens equivalent units according to the position adjusting information of respective columns of lens equivalent units.

The type and structure of the display module are same as those before, and are not repeated herein. It is mentionable that since the positions of the lens equivalent units need to be adjusted, a structure of the lens plate can be designed to include: a first substrate, a second substrate and a liquid crystal layer located between the first substrate and the second substrate, wherein a planar electrode is disposed on the first substrate or the second substrate; a plurality of lattice electrodes arranged in array are disposed on the second substrate; and the lens equivalent units are the lens equivalent units adjustable in position and can be formed by an electric field driving the liquid crystal layer between the plurality of lattice electrodes in a corresponding position area and the planar electrode.

Optionally, in a plurality of or a plurality of columns of lens equivalent units, every three lens equivalent units or every three columns of lens equivalent units are in one group; as for every two adjacent groups of lens equivalent units, one group of lens equivalent units modulate collimated light into light emitted to a left eye visual area, and the other group of lens equivalent units modulate collimated light into light emitted to a right eye visual area, or In two adjacent columns of lens equivalent units, one column of lens equivalent units modulate collimated light into light emitted to a left eye visual area, and the other column of lens equivalent units modulate collimated light into light emitted to a right eye visual area.

For example, each lens equivalent unit only redirects light incident from one of the plurality of pixel units corresponding to the lens equivalent unit toward the left eye visual area or the right eye visual area. That is, each lens equivalent unit of the lens plate only modulates the collimated light of one pixel, in this way, a light path is easier to control and control precision is higher, the light path of the light passing through the lens equivalent unit is easier, an emergent direction of the light can be controlled precisely, the light is enabled to fall within the left eye visual area or the right eye visual area accurately, such that a 3D display effect is enhanced, besides, the display module is more energy-saving by closing pixels that are not required.

For example, as shown in the left portion of FIG. 3, at a first moment, blue light, red light and green light correspondingly emitted from the lens equivalent units 30*a*, 30*b* and 30*c* enter a viewer's right eye and are mixed; and the blue light, the red light and the green light correspondingly emitted from the lens equivalent units 30*d*, 30*e* and 30*f* enter a viewer's left eye and are mixed.

As shown in the right portion of FIG. 3, at a second moment, positions of the eyes are changed, and the positions of respective columns of lens equivalent units 30 of the lens plate are also moved for a certain distance. That is, the positions of the lens equivalent units 30*a*-30*f* relative to respective pixels P of the display module 1 are changed, and are changed to the positions as shown by a solid line in the right drawing of FIG. 3 from the positions shown by a solid line in the left drawing of FIG. 3. The blue light, red light and green light correspondingly emitted from the lens equivalent units 30*a*, 30*b* and 30*c* enter a viewer's right eye and are mixed; and the blue light, the red light and the green light correspondingly emitted from the lens equivalent units 30*d*, 30*e* and 30*f* enter a viewer's left eye and are mixed.

In the technical solution of the embodiments of the present disclosure, a plurality of pixels opposite to the lens equivalent units in the display module are selected and controlled to be turned on/off, the control device determines the position adjusting information of the respective columns of lens equivalent units according to the left eye position moving information and the right eye position moving information, and adjust positions of the respective columns of lens equivalent units of the lens plate according to the position adjusting information. By adopting the solution, precise 3D image information can be provided for left and right eyes of the viewer, even if the eye positions are moved, the left and right eyes can still view a preferred image, such that the image crosstalk is reduced, the 3D display quality is improved and energy saving is improved.

Based on the same inventive concept, yet another embodiment of the present disclosure provides a 3D display control system, comprising a display module, a lens plate, an eye position detection device and a control device, wherein:

The lens plate is located on a light emergent side of the display module, and includes a plurality of lens equivalent units arranged in array, the lens equivalent units are lens equivalent units adjustable in position, and each column of lens equivalent units modulate collimated light into light emitted to a left eye visual area or a right eye visual area;

The eye position detection device is configured to detect left eye position moving information and right eye position moving information of a viewer; and The control device is connected to the eye position detection device, the lens plate and the display module, and configured to determine data information of the display module and display an image corresponding to the data information in the display module according to the left position moving information and the right eye position moving information; determine position adjusting information of respective columns of lens equivalent units; and adjust positions of the lens equivalent units of the lens plate according to the position adjusting information of the lens equivalent units.

For example, each lens equivalent unit only redirect the incident light from one of the plurality of pixel units corresponding to the lens equivalent unit toward the left eye visual area or the right eye visual area. In this way, a light path is easier to control and control precision is higher, such that the 3D display quality is further improved and greater energy saving effect is realized.

Optionally, in a plurality of or a plurality of columns of lens equivalent units, every three lens equivalent units or every three columns of lens equivalent units are in one group; as for every two adjacent groups of lens equivalent units, one group of lens equivalent units modulate collimated light into light emitted to a left eye visual area, and the other group of lens equivalent units modulate collimated light into light emitted to a right eye visual area, or In two adjacent columns of lens equivalent units, one column of lens equivalent units modulate collimated light into light emitted to a left eye visual area, and the other column of lens equivalent units modulate collimated light into light emitted to a right eye visual area.

For example, as shown in the left portion of FIG. 4, at a first moment, blue light, red light and green light correspondingly emitted from the lens equivalent units 30a, 30b and 30c enter a viewer's right eye and are mixed; and the blue light, the red light and the green light correspondingly emitted from the lens equivalent units 30d, 30e and 30f enter a viewer's left eye and are mixed.

As shown in the right portion of FIG. 4, at a second moment, positions of the eyes are changed, and the positions of respective columns of lens equivalent units 30 of the lens plate are also accordingly moved for a certain distance. That is, the positions of the lens equivalent units 30a-30f relative to respective pixels P of the display module 1 are changed to the positions as shown by a solid line in the right portion of FIG. 3 from the positions shown by a solid line in the left portion of FIG. 3. The green light, blue light and red light correspondingly emitted from the lens equivalent units 30a, 30b and 30c enter a viewer's right eye and are mixed; and the green light, the blue light and the red light correspondingly emitted from the lens equivalent units 30d, 30e and 30f enter a viewer's left eye and are mixed.

Similar to the principle of the foregoing embodiment, by adopting the solution, precise 3D image information can be provided for left and right eyes of the viewer; even if the eye positions are moved, the left and right eyes can still view a preferred image, such that the image crosstalk is reduced, the 3D display quality is improved and energy saving is improved. In addition, compared with the solution of the foregoing embodiment, by adjusting the positions of the lens equivalent units and the pixels of the display module simultaneously, adjusting and controlling sensitivity can be improved, and a better 3D display effect is provided for the viewer.

It is obvious that a person skilled in the art can make various changes or modifications to the present disclosure without departing from the spirit and scope of the present disclosure. Thus, if such changes and modifications to the present disclosure are within the scope of the claims of the present disclosure and equivalent thereof, the present disclosure also intends to include all such changes and modifications within its scope.

The foregoing embodiments merely are exemplary embodiments of the disclosure, and not intended to define the scope of the disclosure, and the scope of the disclosure is determined by the appended claims.

The application claims priority of Chinese Patent Application No. 201610012126.X filed on Jan. 8, 2016, the disclosure of which is incorporated herein by reference in its entirety as part of the present application.

The invention claimed is:

1. A 3D display control system, comprising:
 a display module, including a plurality of pixel units;
 an eye position detection device, configured to detect first position moving information and second position moving information; and
 a lens plate, located at a light emergent side of the display module, and configured to generate a plurality of first lens equivalent units and a plurality of second lens equivalent units, wherein at least one pixel unit directly below each first lens equivalent unit forms a first pixel unit group, and each first lens equivalent unit is configured to redirect light from the first pixel unit group directly there below toward a first position; at least one pixel unit directly below each second lens equivalent unit forms a second pixel unit group, and each second lens equivalent unit is configured to redirect light from the second pixel unit group directly there below toward a second position; and
 a control device, connected to the eye position detection device, the lens plate and the display module, and configured to execute at least one of a first operation and a second operation according to the first position moving information and the second position moving information, wherein the first operation is to determine data alignment information of the display module and display an image corresponding to the data alignment information in the display module; the second operation is to determine position adjusting information of the plurality of first lens equivalent units and the plurality of second lens equivalent units of the lens plate relative to the pixels units of the display module, and adjust positions of the plurality of first lens equivalent units and the plurality of second lens equivalent units relative to the pixel units of the display module according to the position adjusting information, the plurality of first lens equivalent units form a plurality of first lens equivalent unit groups, the plurality of second lens equivalent units form at least one second lens equivalent unit group, each first lens equivalent unit group includes three adjacent ones of the first lens equivalent units, each second lens equivalent unit group includes three adjacent ones of the second lens equivalent units, and the plurality of first lens equivalent unit groups and the plurality of first lens equivalent unit groups are alternately arranged.

2. The system according to claim 1, wherein the first position and the second position are respectively positions where left and right eyes of a viewer are.

3. The system according to claim 1, wherein each first lens equivalent unit and each second lens equivalent unit are both column lens equivalent units.

4. The system according to claim 1, wherein the first lens equivalent units and the second lens equivalent units are arranged in array.

5. The system according to claim 1, wherein the first pixel unit group directly below each first lens equivalent unit includes a plurality of pixel units, and the second pixel unit group directly below each second lens equivalent unit includes a plurality of pixel units, each first lens equivalent unit is configured to only redirect light from one pixel unit of the first pixel unit group directly there below toward the first position at a same moment; and each second lens equivalent unit is configured to only redirect light from one pixel unit of the second pixel unit group directly there below toward a second position at a same moment.

6. The system according to claim 1, wherein the plurality of first lens equivalent units are arranged into a plurality of first lens equivalent unit columns, the plurality of second lens equivalent units are arranged into a plurality of second lens equivalent unit columns, and the plurality of first lens equivalent unit columns and the plurality of second lens equivalent unit columns are alternately arranged.

7. The system according to claim 1, wherein the lens plate is a liquid crystal lens plate.

8. The system according to claim 1, wherein light from the first pixel unit group is collimated light, and the light from the second pixel unit group is collimated light.

9. A display control method for the 3D display control system according to claim 1, comprising:
obtaining first position moving information and second position moving information; and
executing at least one of a first operation and a second operation according to the first position moving information and the second position moving information.

10. The method according to claim 9, wherein
a first pixel unit group directly below each first lens equivalent unit includes a plurality of pixel units, and a second pixel unit group directly below each second lens equivalent unit includes a plurality of pixel units, the method further comprises:
controlling each first lens equivalent unit to only redirect light from a pixel unit of the first pixel unit group directly there below toward a first position at a same moment; and/or
controlling each second lens equivalent unit to only redirect light from a pixel unit of the second pixel unit group directly there below a second position at the same moment.

11. The method according to claim 10,
further comprising:
controlling lights transmitted by the three first lens equivalent units of each first lens equivalent unit group at a same time to be different from one another in color, and/or
controlling lights transmitted by the three second lens equivalent units of each second lens equivalent unit group at the same time to be different from one another in color.

12. The method according to claim 10, further comprising:
controlling the pixel units, except for the one pixel unit, of the first pixel unit group directly below each first lens equivalent unit to be turned off at the same moment; and/or
controlling the pixel units, except for one pixel unit, of the second pixel unit group directly below each second lens equivalent unit to be turned off at the same moment.

13. The method according to claim 9, wherein the lens plate is a liquid crystal lens plate.

14. The method according to claim 9, wherein light from the first pixel unit group is collimated light, and the light from the second pixel unit group is collimated light.

15. The system according to claim 2, wherein each first lens equivalent unit and each second lens equivalent unit are both column lens equivalent units.

16. The system according to claim 2, wherein the first lens equivalent units and the second lens equivalent units are arranged in array.

17. The system according to claim 2, wherein the first pixel unit group directly below each first lens equivalent unit includes a plurality of pixel units, and the second pixel unit group directly below each second lens equivalent unit includes a plurality of pixel units, each first lens equivalent unit is configured to only redirect light from one pixel unit of the first pixel unit group directly there below toward the first position at a same moment; and each second lens equivalent unit is configured to only redirect light from one pixel unit of the second pixel unit group directly there below toward a second position at a same moment.

18. The system according to claim 2, wherein
the plurality of first lens equivalent units are arranged into a plurality of first lens equivalent unit columns, the plurality of second lens equivalent units are arranged into a plurality of second lens equivalent unit columns, and the plurality of first lens equivalent unit columns and the plurality of second lens equivalent unit columns are alternately arranged.

* * * * *